(12) United States Patent
Széll et al.

(10) Patent No.: US 9,205,818 B2
(45) Date of Patent: Dec. 8, 2015

(54) BRAKE SYSTEM AND METHOD FOR CONTROLLING A VEHICLE BRAKE

(75) Inventors: Péter Széll, Budapest (HU); László Gianone, Budapest (HU); Gergely Szabó, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 1011 days.

(21) Appl. No.: 12/999,948

(22) PCT Filed: Jun. 10, 2009

(86) PCT No.: PCT/EP2009/004160
§ 371 (c)(1),
(2), (4) Date: Feb. 4, 2011

(87) PCT Pub. No.: WO2009/152981
PCT Pub. Date: Dec. 23, 2009

(65) Prior Publication Data
US 2011/0125381 A1    May 26, 2011

(30) Foreign Application Priority Data
Jun. 20, 2008 (DE) .................. 10 2008 029 311

(51) Int. Cl.
*B60T 8/172* (2006.01)
*B60T 8/32* (2006.01)
*B60T 7/04* (2006.01)

(52) U.S. Cl.
CPC ................ *B60T 8/327* (2013.01); *B60T 7/042* (2013.01); *B60T 8/321* (2013.01); *B60T 2220/04* (2013.01); *B60T 2270/402* (2013.01); *B60T 2270/404* (2013.01); *B60T 2270/82* (2013.01)

(58) Field of Classification Search
CPC ......... B60T 7/042; B60T 8/321; B60T 8/327; B60T 2270/82; B60T 2270/402; B60T 2270/404; B60T 2220/04
USPC ...................................... 701/70, 97
See application file for complete search history.

(56) References Cited

U.S. PATENT DOCUMENTS 5,255,962 A  10/1993 Neuhaus et al.
5,952,799 A  9/1999  Maisch et al.
(Continued)

FOREIGN PATENT DOCUMENTS

DE    40 22 671   1/1992
DE    195 10 525   9/1996
(Continued)

OTHER PUBLICATIONS

European Patent Office, International Preliminary Report on Patentability and Written Opinion, Jan. 6, 2011, from International Patent Application No. PCT/EP2009/004160, filed on Jun. 10, 2009.
(Continued)

*Primary Examiner* — Marthe Marc-Coleman
(74) *Attorney, Agent, or Firm* — Kenyon & Kenyon LLP

(57) ABSTRACT

The brake system for motor vehicles has a brake pedal unit having a sensor, which has an intelligence of its own in the form of an electronic processing unit, which directly calculates actuating signals for brake actuators. Furthermore, the brake system has a central electronic control unit, which ascertains actuating signals for the actuators on the basis of an analog or digital signal of the mentioned sensor or of an additional sensor. The actuators have an intelligence of their own in the form of an electronic processing unit, which verifies whether the actuating signal coming from the central electronic control unit is valid. If this is the case, then the actuators are controlled by this signal, otherwise on the basis of the actuating signal calculated by the sensor.

12 Claims, 5 Drawing Sheets

(56) References Cited

U.S. PATENT DOCUMENTS

| | | |
|---|---|---|
| 5,954,407 A | 9/1999 | Schramm et al. |
| 6,203,115 B1 | 3/2001 | Rosendahl et al. |
| 6,213,567 B1 | 4/2001 | Zittlau et al. |
| 6,317,675 B1 | 11/2001 | Stolzl et al. |

FOREIGN PATENT DOCUMENTS

| | | |
|---|---|---|
| DE | 196 34 567 | 3/1998 |
| DE | 198 32 167 | 5/1999 |
| DE | 198 53 036 | 6/1999 |
| DE | 198 41 335 | 8/1999 |
| DE | 198 15 440 | 10/1999 |
| DE | 101 18 262 | 10/2002 |
| DE | 103 57 373 | 7/2005 |
| DE | 10 2005 062 907 | 5/2007 |
| EP | 0 949 130 | 10/1999 |

OTHER PUBLICATIONS

European Patent Office, Translation of International Preliminary Report on Patentability and Written Opinion, Jan. 27, 2011, from International Patent Application No. PCT/EP2009/004160, filed on Jun. 10, 2009.

BRAKE SYSTEM AND METHOD FOR CONTROLLING A VEHICLE BRAKE

FIELD OF THE INVENTION

The present invention relates to a brake system and to a method for controlling a vehicle brake.

BACKGROUND INFORMATION

German patent document DE 103 57 373 B4 discusses an electronic brake system for a vehicle having at least two brake circuits, which has a braking request recording device having two autonomous braking request recording means, one of which is connected to a central control unit while the other is connected to an autonomous brake circuit control system that is independent of the central electronic control unit. In the event of a failure of the central electronic control unit, the brake circuit control system in cooperation with the one braking request recording means assumes all activations of the vehicle brakes. The braking request recording means are sensors integrated into a brake pedal unit. This creates a certain redundancy.

German patent document DE 19815440 A1 refers to providing for a braking value sensor and a part of a control electronics of a vehicle brake system to be combined into one unit.

SUMMARY OF THE INVENTION

An objective of the exemplary embodiments and/or exemplary methods of the present invention is to improve the brake system and the method of the kind mentioned at the outset in such a way that a greater reliability is ensured even in the event of a failure of the central electronic control unit.

This objective may be achieved by the features described herein. Advantageous refinements and developments of the present invention may be gathered from the further descriptions herein.

One aspect of the exemplary embodiments and/or exemplary methods of the present invention is to use, in addition to an "intelligent" central electronic control unit, at least one intelligent sensor and intelligent actuators. Intelligent in this sense means that the sensor and actuators contain autonomous electronic processing units including software that are independent of the central electronic control unit. The intelligent sensor independently calculates actuating signals for the actuators. The actuators for their part verify whether the actuating signal from the central electronic control unit is valid or not. If the actuating signal is valid, then the brake is controlled by it, i.e. by the central electronic control unit. If it is invalid, on the contrary, then the actuating signal ascertained by the intelligent sensor is used to control the brake.

Both mentioned actuating signals from the central electronic control unit and from the intelligent sensor may be distributed via a network or two separate networks, the brake pedal unit, the central electronic control unit and the actuators being able to communicate bidirectionally via the network.

The brake pedal unit and the actuators likewise communicate bidirectionally with each other and thus form a system that is redundant with respect to the central electronic control unit. The brake pedal unit and the actuators of course are also able to read in and process signals from additional sensors, for example from wheel speed sensors, pressure sensors, roll angle sensors, transversal acceleration sensors, axle load sensors, steering angle sensors etc.

According to a further development of the exemplary embodiments and/or exemplary methods of the present invention, a third fallback level may be additionally implemented by a purely pneumatic brake control system. For this purpose, the brake pedal unit contains customary, purely pneumatic control valves, the intelligent actuators automatically switching to a purely pneumatic control system in the event of a failure of the entire electronic system.

According to another further development of the exemplary embodiments and/or exemplary methods of the present invention, the brake pedal unit has two sensors. One of these may in turn be equipped with an intelligence of its own, while the other is a purely passive sensor, for example a potentiometer or another position sensor for the position of the brake pedal. The signal of this non-intelligent sensor is supplied to the (intelligent) central electronic control unit and from there is processed into an actuating signal.

The exemplary embodiments and/or exemplary methods of the present invention are explained in greater detail below on the basis of exemplary embodiments with reference to the drawing.

DETAILED DESCRIPTION

Figure 1:
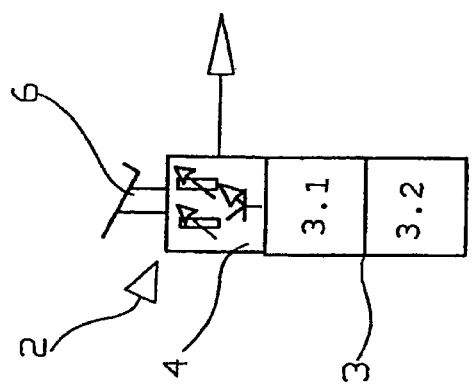
FIG. 1 shows an exemplary embodiment of a pedal unit of the brake system.

FIG. 1 shows a brake pedal unit 2, which has a pneumatic control valve 3 and a sensor 4, which is connected to a brake pedal 6 and which senses its position or movement. Sensor 4 is equipped with an intelligence of its own, i.e. it contains electronics that process the output signals of sensor elements, as will be explained further below. Electrical and pneumatic connectors of brake pedal unit 2 are left out for the purpose of clarity. Such a brake pedal unit is also suitable for example for a brake system according to the DE 103 57 373 84 document mentioned at the outset.

Figure 2:
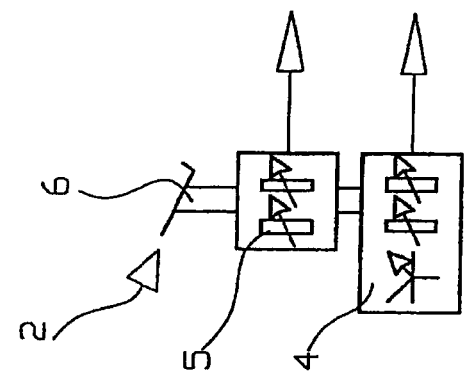
FIG. 2 shows another exemplary embodiment of a pedal unit of the brake system.

FIG. 2 shows a brake pedal unit 2 having two redundant sensors 4 and 5, of which sensor 4 in turn has an intelligence of its own in the form of an electronic circuit, while sensor 5 has no intelligence of its own. Such a brake pedal unit may be used for a "brake-by-wire" system.

Figure 3:
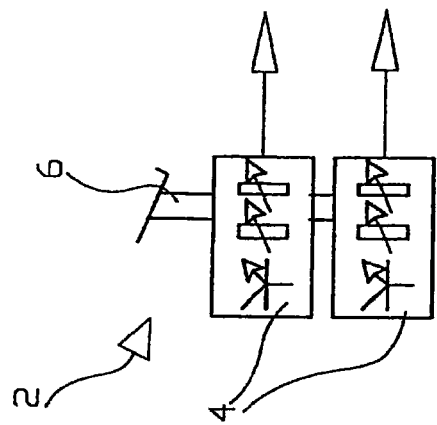
FIG. 3 shows another exemplary embodiment of a pedal unit of the brake system.

Brake pedal unit 2 of FIG. 3 has two redundant sensors 4, which respectively have an intelligence of their own and are likewise connected to brake pedal 6.

In the exemplary embodiments of FIGS. 2 and 3, brake pedal unit 2 thus has two electrical outputs that are independent of each other.

FIG. 9 shows a brake system according to a first exemplary embodiment of the present invention, in which a brake pedal unit 2 as shown in FIG. 1 is used.

Brake system 1 of FIG. 9 has a brake pedal unit 2 according to the exemplary embodiment of FIG. 1 with the requirement that brake pedal unit 2 has two pneumatic control valves 3.1 and 3.2 and one intelligent sensor 4. Control valves 3.1 and 3.2 are connected respectively via a pneumatic line 7.1 and 7.2 to separate pressure reservoirs 8.1 and 8.2, respectively. Pneumatic control valve 3.1 is connected via a pneumatic line 7.1 to control valves 9.1 and 9.2 for brake actuators 10.1 and 10.2 of the wheels of the rear axle of the vehicle. Control valve 3.2 is connected via a pneumatic line 7.2 to control valves 11.1 and 11.2 for brake actuators 12.1 and 12.2 of the brakes of the front axle of the vehicle. The brake system thus has two separate brake circuits for the brakes of the rear axle and the front axle.

In the present exemplary embodiment, brake actuators 10.1 and 14.2 are pneumatically actuated spring-loaded brakes.

The intelligent sensor 4 of brake pedal unit 2 is connected via an electrical line 13 to a central electronic control unit 14, which is connected via electrical lines 15.1 through 15.4 to control valves 9.1, 9.2, 11.1 and 11.2. Electrical lines 13 and 15.1 through 15.4 form a network 16, which allows both for communication between intelligent sensor 4 and central electronic control unit 14 as well as for a direct communication between intelligent sensor 4 and control valves 9.1, 9.2, 11.1 and 11.2 as well as of course between central electronic control unit 14 and the mentioned control units 9.1, 9.2, 11.1 and 11.2.

Control valves 9.1, 9.2, 11.1 and 11.2 likewise have an intelligence of their own and may be controlled pneumatically via pneumatic lines 7.1 and 7.2 or electrically via electrical lines 15.1 through 15.4.

Intelligent sensor 4 supplies the braking request signal triggered by the driver by actuating brake pedal 6 via electrical line 13 to network 16. This signal is received both by central electronic control unit 14 as well as by control valves 9.1, 9.2, 11.1 and 11.2. Furthermore, a pneumatic signal is conducted from the two pneumatic control valves 3.1 and 3.2 via pneumatic lines 7.1 and 7.2 to the control valves.

As will be explained in more detail in connection with FIG. 6, brake actuators 10.1, 10.2 and 12.1, 12.2 are controlled in three different manners.

Intelligent sensor 4 ascertains the movement or position of brake pedal 6, which is proportional to the braking request initiated by the driver. This signal is already preprocessed by intelligent sensor 4 into a braking request signal on the basis of a separate software and separate electronics in intelligent sensor 4 by taking into account additional parameters of the vehicle and possibly additional signals from other sensors, which are not represented here. Intelligent sensor 4 calculates an actuation request on the basis of predefined characteristics or on the basis of characteristics that are transmitted to it from central electronic control unit 14. These may also be parameters, which are automatically "learned" during one or multiple braking processes, it also being possible to process return signals from control valves 9.1, 9.2, 11.1 and 11.2.

Intelligent control valves 9.1, 9.2, 11.1 and 11.2 are connected to network 16, which control the air supply and the pressure in brake actuators 10.1, 10.2, 12.1 and 12.2. Central electronic control unit 14 contains a processing unit, which ascertains a brake actuating instruction for each of control valves 9.1, 9.2, 11.1 and 11.2. Intelligent control valves 9, 11 are able to read the actuating signal from the network and trigger a corresponding pneumatic pressure in actuators 10.1, 10.2, 12.1 and 12.2.

Intelligent sensor 4 detects the movement of brake pedal 6, the movement or position of which is proportional to the braking request desired by the driver. The intelligent sensor converts this signal into an electrical format and transmits it via line 13 to network 16. The format of the signal may be a signal that is proportional to the braking request or it may be a brake actuating signal. Control valves 9, 11 are able to interpret this signal and build up the corresponding pressure.

Brake pedal unit 2 has the two pneumatic control valves 3.1 and 3.2, which provides an air pressure that is proportional to the position of brake pedal 6. This pressure is supplied by pneumatic control valves 3.1 and 3.2 via lines 7.1 and 7.2 to control valves 9.1, 9.2, 11.1 and 11.2 for the brakes of the front and the rear axle. This pneumatic pressure then produces corresponding brake pressures in actuators 10, 12.

All three described types of control, that is, via central electronic control unit 14, network 16 and the direct pneumatic control via pneumatic control valves 3.1 and 3.2, run parallel in time, the brake system selecting the most favorable system depending on the availability and state of these three systems. This is described in more detail in connection with FIG. 6.

Figure 4:
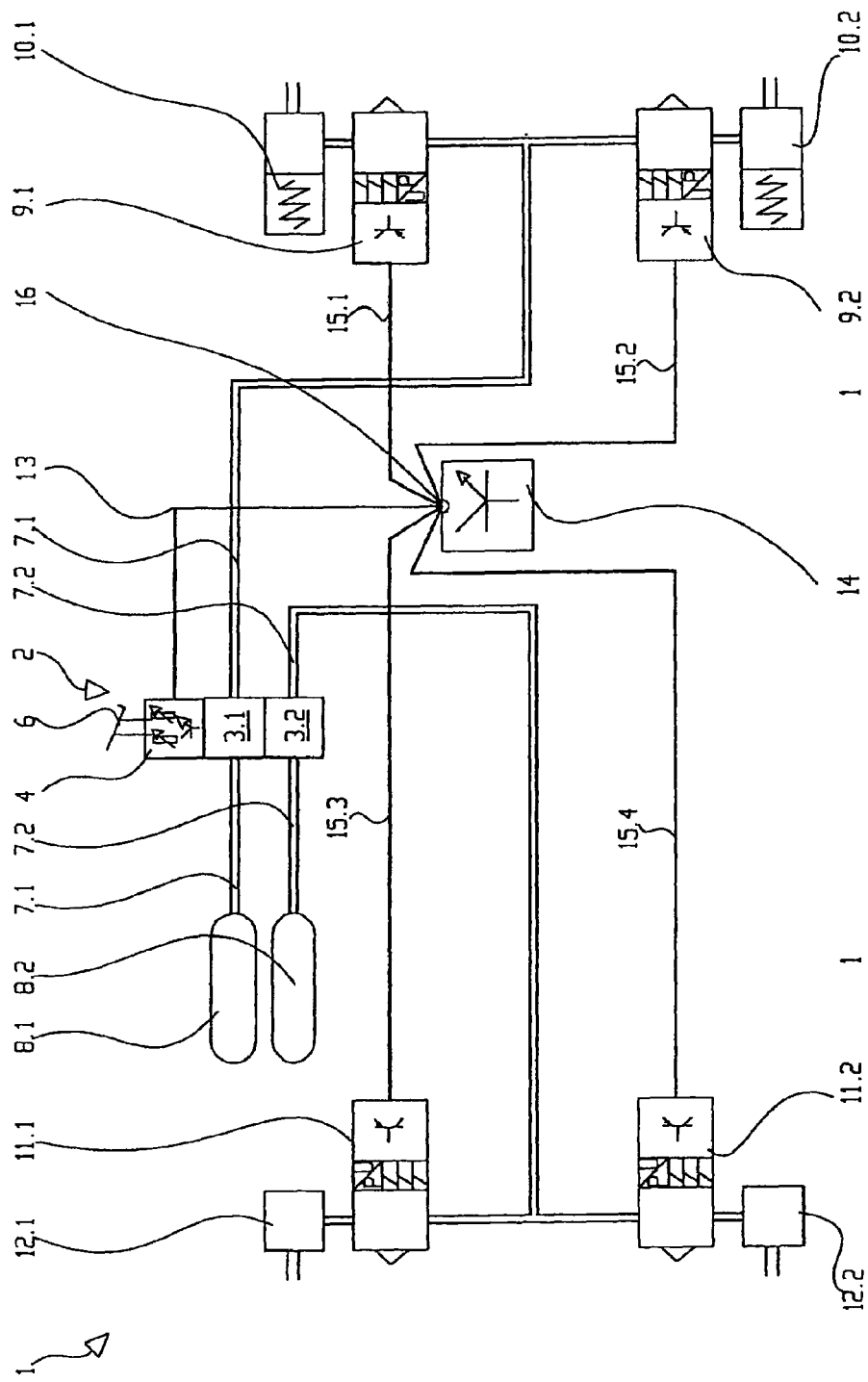
FIG. 4 shows a first exemplary embodiment of a brake system according to the present invention.
Figure 6:
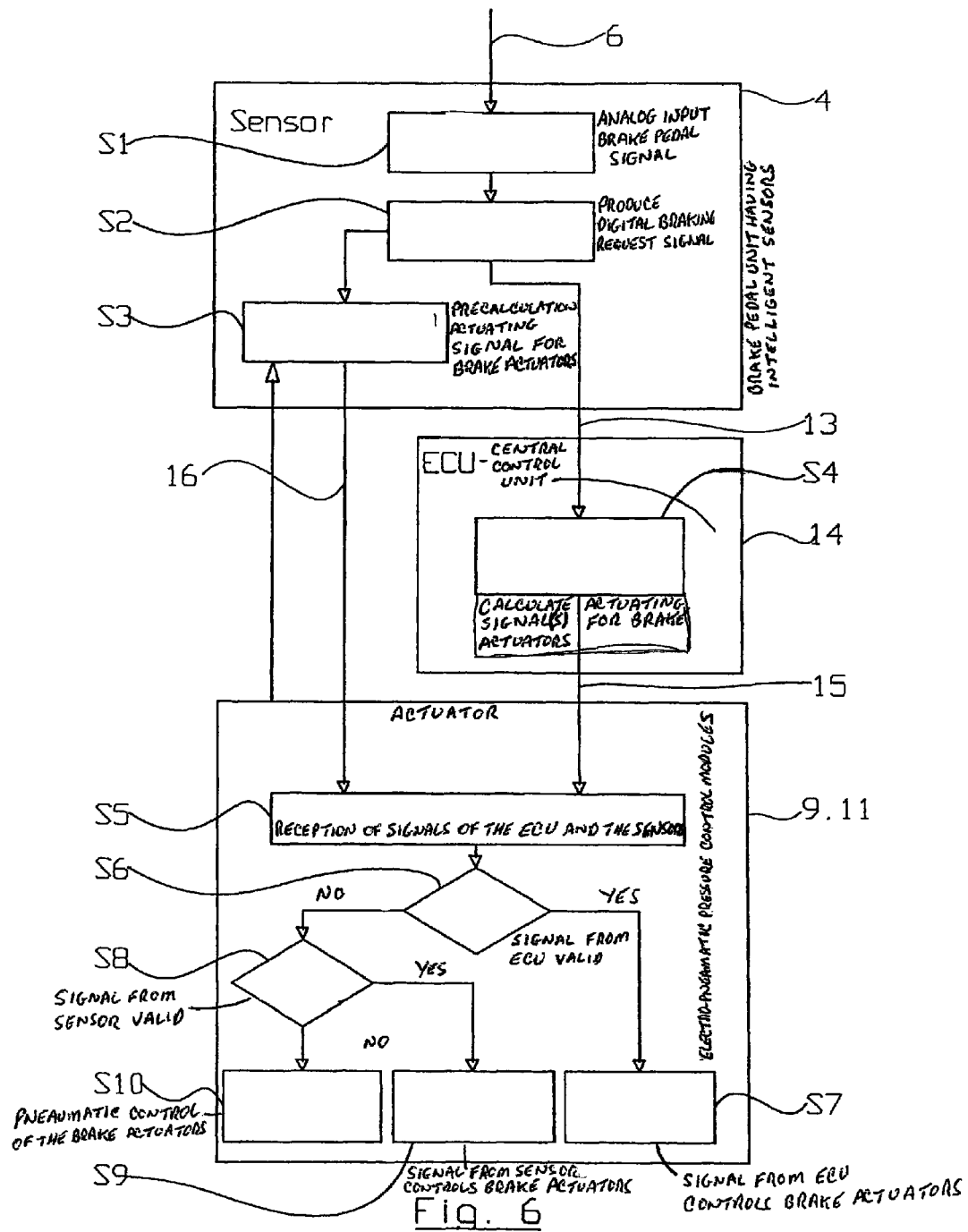
FIG. 6 shows a flow chart for explaining the principle of operation of a brake system as shown in FIG. 4 having a brake pedal unit as shown in FIG. 1.

FIG. 6 describes the principle of operation of the brake system of FIG. 4 or the method according to the present invention. In a step S1, in brake pedal unit 2, an analog braking request signal is produced by sensors 4 by pressing brake pedal 6, which is then converted into a digital braking request signal by intelligent sensor 4 in a step S2. In a step S3, in intelligent sensor 4, an actuating signal for brake actuators 9, 11 is precalculated from this digital signal and is transmitted via network 16 directly to control valves 9.1, 9.2, 11.1 and 11.2. In parallel, the digital braking request signal of step S2 is also supplied to central electronic control unit 14, which calculates an actuating signal in a step S4, which is then likewise supplied to the control valves.

In a step S5, the actuating signals from steps S3 and S4 are transmitted in parallel to control valves 9, 11, where a check is performed in a step S6 as to whether the actuating signal coming from central electronic control unit 14 and calculated in step S4 is valid or not. This actuating signal coming from central electronic control unit 14 has priority and, if it is valid, is implemented in step S7, whereby a brake actuation is triggered, which is based on the actuating signal of central electronic control unit 14. If, on the contrary, it is determined in step S6 that the actuating signal from step S4 is invalid, then a check is performed in a step S8 as to whether the actuating signal calculated by the intelligent sensor in step S3 is valid. If this is the case, then a brake actuation is triggered in step S9, which is based on the actuating signal ascertained by intelligent sensor 4 in step S3.

If this actuating signal is also invalid, then a purely pneumatic braking action is initiated as a third fallback level in step S10, on the basis of the pneumatic pressured coming from pneumatic control valves 3.1 and 3.2.

Thus a three-stage hierarchy is provided. Central electronic control unit 14 has first priority, intelligent sensor 4 has second priority, and the purely pneumatic braking action has third priority.

In precalculating the actuating signal in step S3 and also in calculating the actuating signal in step S4, various influence variables may of course be taken into account, which are either predefined in a vehicle-specific manner and stored in the software or are ascertained by sensors (not shown) and transmitted via network 16 to intelligent units 4, 14, 9 and 11. For example, influence variables such as axle load distribution, lockup danger, coupling force between a tractor and a trailer and other variables influencing the stability of a vehicle may be taken into account.

Figure 5:
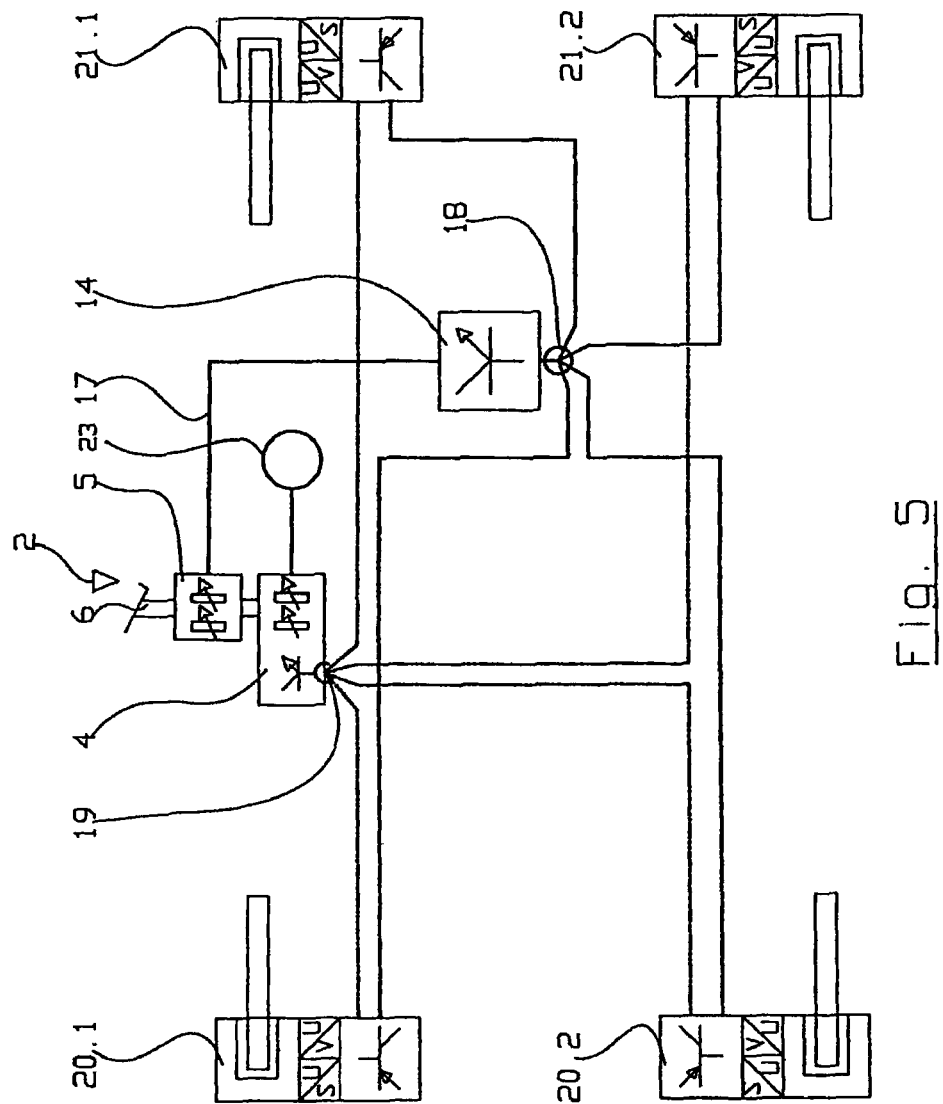
FIG. 5 shows a brake system according to a second exemplary embodiment of the present invention.

FIG. 5 shows a second exemplary embodiment of the brake system according to the present invention. In this case, brake pedal unit 2 is developed in accordance with the exemplary embodiment of FIG. 2 and has two types of sensors, that is, an intelligent sensor 4 and a sensor 5 without an intelligence of its own. Sensor 5 is connected via a line 17 to central electronic control unit 14, while intelligent sensor 4 is connected to network 19. Additional sensors 23 may be connected to sensor 4, which supply sensor 4 with vehicle-specific or driving dynamics-specific measured variables. For the sake of improved clarity, the electrical lines of network 19 are represented as dashed lines, while the electrical lines of network 18 connected to central control unit 14 are represented as solid lines.

In the exemplary embodiment of FIG. 5, the brake actuators are actuated purely electrically and are in turn equipped with an intelligence of their own. Brake actuators 20.1 and 20.2 for the front axle and 21.1 and 21.2 for the rear axle are respectively connected to the two networks 18 and 19, that is, ultimately to central electronic control unit 14 and intelligent sensor 4. Analogous to the first exemplary embodiment, intelligent brake actuators 20 and 21 decide whether to execute instructions coming from control unit 14 via network 18 or from intelligent sensor 4 via network 19, while here too the instructions coming from control unit 14 via network 18 have priority and the instructions coming from intelligent sensor 4 via network 19 are used as a fallback level.

This is explained in more detail in connection with FIG. 7, which will be referenced now.

In this case, brake pedal unit 2 has the two sensors 4 and 5. As in the first exemplary embodiment, intelligent sensor 4 performs steps S1, S2 and S3, which are then supplied via network 19 to brake actuators 20, 21. In parallel, non-intelligent sensor 5 produces an electrical braking request signal in step S11, which possibly in step S12 is still converted as a digital signal, it being necessary in this case that non-intelligent sensor 5 directly produces a digital output signal.

The output signal of non-intelligent sensor 5 is supplied via line 17 to central electronic control unit 14, which in step S4 calculates an actuating signal for the brake actuators in the same manner as in the first exemplary embodiment. Here too, additional input variables are taken into account in a manner known per se. After step S4, the actuating signal is supplied via network 18 to the individual brake actuators 20, 21. There the signals applied on networks 18 and 19 are received in step S5 and again a check is performed in step S6 as to whether the signal coming from central electronic control unit 14 is valid. If this is the case, then this actuating signal is supplied to actuators 20 and 21 in step S7. If, on the contrary, the signal coming from central electronic control unit 14 is invalid, then the signal coming from intelligent sensor 4 via network 19 is selected and supplied to the actuators in step S9.

In this connection, talk of "the signal" of course may also refer to multiple signals since different actuating signals may be supplied to the individual actuators, for example for taking into account a braking force distribution in accordance with the axle loads, driving dynamics control, lockup protection etc.

Figure 7:
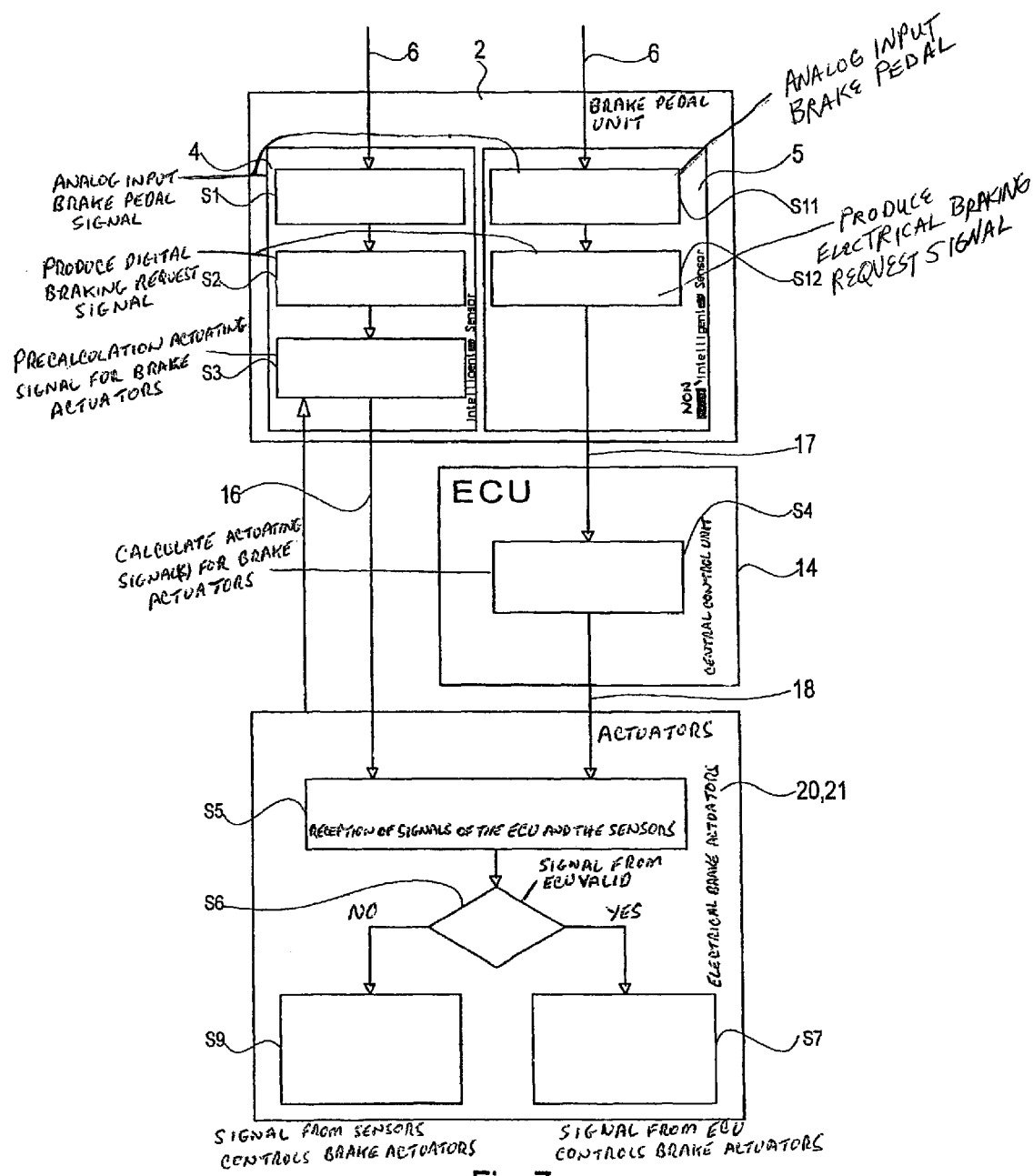
FIG. 7 shows a flow chart of a brake system as shown in FIG. 5 having a brake pedal unit as shown in FIG. 2.

It is clear to one skilled in the art that the exemplary embodiments of FIGS. 5 and 7 may also be modified in such a way that a brake pedal unit 2 as shown in FIG. 3 having two intelligent sensors may be used. The one sensor is then connected to central electronic control unit 14 and the other is connected to network 19.

What is claimed is:

1. A brake system for a motor vehicle, comprising:
    a brake pedal unit having at least one sensor, which produces an electrical braking request signal corresponding to a position of a brake pedal; and
    a central electronic control unit, which produces a first actuating signal for brake actuators from the braking request signal, wherein the at least one sensor has its own electronic processing unit, which produces a second electrical actuating signal, based on the electrical braking request signal, for the brake actuators, which is supplied via a network directly to the brake actuators, and wherein the brake actuators have their own electronic processing unit;
    wherein the processing units of the brake actuators include a verifying and selecting arrangement to verify whether the first actuating signal from the central electronic control unit is valid and to select, as a function of the verification, the first actuating signal from the central electronic control unit or the second actuating signal from the at least one sensor for activating the brake actuators, and wherein the first actuating signal has priority over the second actuating signal,
    wherein the first actuating signal is used if the first actuating signal is valid, as determined by the processing unit of the brake actuator, and
    wherein the second actuating signal is used if the second actuating signal is not valid, as determined by the processing unit of the brake actuator.

2. The brake system of claim 1, wherein the sensor, the central electronic control unit and the actuators are together connected to a bidirectional network.

3. The brake system of claim 2, wherein the sensor includes a reading arrangement to read in data from the actuators.

4. The brake system of claim 2, wherein the brake pedal unit has pneumatic control valves, which conduct compressed air to the actuators as a function of the position of a brake pedal, and wherein the processing units of the brake actuators activate brake cylinders purely pneumatically if the first actuating signal from the central electronic control unit and the second actuating signal from the sensor are invalid.

5. The brake system of claim 2, wherein the brake pedal unit has two sensors of which the one sensor has its own electronic processing unit and the other sensor is a passive sensor, the electrical output signal of which is suppliable to the central electronic control unit, wherein the first sensor is connected via a separate network directly to the actuators and the output of the central control unit is connected via another network to the actuators, and wherein the brake actuators execute actuating signals on the second network with priority and execute actuating signals on the first network only if the actuating signals on the second network are invalid.

6. The brake system of claim 2, wherein the sensor includes a reading arrangement to read in data from additional sensors.

7. The brake system of claim 1, wherein the sensor, the central electronic control unit and the actuators are together connected to a bidirectional network, and wherein the sensor includes a reading arrangement to read in data from the actuators.

8. The brake system of claim 7, wherein the brake pedal unit has pneumatic control valves, which conduct compressed air to the actuators as a function of the position of a brake pedal, and wherein the processing units of the brake actuators activate brake cylinders purely pneumatically if the first actuating signal from the central electronic control unit and the second actuating signal from the sensor are invalid.

9. The brake system of claim 7, wherein the brake pedal unit has two sensors of which the one sensor has its own electronic processing unit and the other sensor is a passive sensor, the electrical output signal of which is suppliable to the central electronic control unit, wherein the first sensor is connected via a separate network directly to the actuators and the output of the central control unit is connected via another network to the actuators, and wherein the brake actuators execute actuating signals on the second network with priority and execute actuating signals on the first network only if the actuating signals on the second network are invalid.

10. A method for controlling a brake system for motor vehicles, the method comprising:
producing an electrical signal in a sensor that corresponds to a position of the brake pedal;
digitizing the electrical signal in the sensor;
ascertaining an actuating signal for brake actuators based on the digitized signal in the sensor and at the same time transmitting the digitized signal to a central electronic control unit;
calculating actuating signals for brake actuators in the central electronic control unit;
reading in the actuating signals from the central electronic control unit and from the sensor in brake actuators;
verifying in the brake actuators whether the actuating signal received from the central electronic control unit is valid;
selecting the actuating signal coming from the central electronic control unit on the part of the brake actuators if it is valid and controlling the brake actuators using this signal;
selecting the actuating signal coming from the sensor on the part of the brake actuators if the actuating signal coming from the central electronic control unit is invalid, and controlling the brake actuators based on the actuating signal from the sensor.

11. The method of claim 10, further comprising:
producing a purely pneumatic actuating signal by a pedal unit as a function of the position of the brake pedal;
conducting the purely pneumatic actuating signal to the brake actuators; and
selecting the purely pneumatic control signal for activating the brake actuators if the first actuating signal and the second actuating signal are invalid.

12. A method for controlling a brake system for motor vehicles, the method comprising:
producing two independent electrical signals as a function of the position of a brake pedal by two separate sensors in a brake pedal unit;
digitizing the first electrical signal of the first sensor and precalculating an actuating signal for brake actuators from the digitized signal in the first sensor and conducting this actuating signal to the actuators;
conducting the second electrical signal of the second sensor to a central control unit;
ascertaining an actuating signal for brake actuators in the central electronic control unit and transmitting the actuating signal to the actuators; and
selecting the actuating signal coming from the central electronic control unit in the actuators if it is valid, selecting the actuating signal coming from the first sensor if the actuating signal coming from the central electronic control unit is invalid, and controlling the actuators by the selected control signal.

* * * * *